(12) United States Patent
Angel et al.

(10) Patent No.: US 6,878,788 B2
(45) Date of Patent: Apr. 12, 2005

(54) METHOD FOR PRODUCING POLYMERS

(75) Inventors: Maximilian Angel, Schifferstadt (DE); Stefan Stein, Woerrstadt (DE); Karin Neubecker, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 148 days.

(21) Appl. No.: 10/203,660

(22) PCT Filed: Mar. 6, 2001

(86) PCT No.: PCT/EP01/02493

§ 371 (c)(1),
(2), (4) Date: Aug. 27, 2002

(87) PCT Pub. No.: WO01/66602

PCT Pub. Date: Sep. 13, 2001

(65) Prior Publication Data

US 2003/0018152 A1 Jan. 23, 2003

(30) Foreign Application Priority Data

Mar. 8, 2000 (DE) ......................................... 100 10 811

(51) Int. Cl.$^7$ ................................................ C08F 26/08

(52) U.S. Cl. .................... 526/264; 526/210; 526/303.1; 526/307.1; 526/328

(58) Field of Search .............................. 526/264, 303.1, 526/328, 307.1, 210

(56) References Cited

U.S. PATENT DOCUMENTS 4,292,421 A * 9/1981 Boileau et al. ............. 526/220
6,399,703 B1 * 6/2002 Fischer et al. ................ 525/54

FOREIGN PATENT DOCUMENTS

| EP | 0 694 565 | 1/1996 |
| FR | 2 305 444 | 10/1976 |
| WO | 93 07188 | 4/1993 |

* cited by examiner

*Primary Examiner*—Helen L. Pezzuto
(74) *Attorney, Agent, or Firm*—Oblon, Spivak, McClelland, Maier & Neustadt, P.C.

(57) ABSTRACT

Proposals are made for a process for preparing polymer solutions and/or polymer dispersions by free-radical addition polymerization and for the use of the polymers prepared, particularly as gas hydrate inhibitors.

30 Claims, No Drawings

METHOD FOR PRODUCING POLYMERS

The invention is situated in the field of addition polymerization reactions and relates to a process for preparing polymers by free-radical addition polymerization and to the use thereof as gas hydrate inhibitors.

In addition polymerization reactions (polymerizations) polymers are formed steplessly from monomers containing reactive multiple bonds. In the case of free-radical polymerization the polymerization is started by the action of free-radical initiators. These initiators are normally dissolved in the same solvent as the monomers and the reaction is then continued by single-stage, multistage or continuous addition of the initiator to the monomers. The limited solubility of a large number of common initiators constitutes a significant restriction on the known processes. In many cases, for the ultimate use of the polymers, a special solvent is desired in which the initiators are insoluble. This makes it necessary to change the solvent, which is technically complex and economically burdensome, after polymerization has taken place. The conceivable direct use of the initiators (in undiluted, liquid or solid form or as a dispersion) is in many cases unrealizable on safety grounds (e.g., risk of separation). Similar objections apply to the use of initiator emulsions, owing to the risk of separation.

One important parameter of polymers (which may be present in the form of solutions and/or dispersions) is their flash point. Particularly in the case of polymers which have to be transported over long distances from production site to site of use, a high flash point is desirable on safety grounds.

It is an object of the present invention to provide a process which makes it possible to obtain polymers without being restricted in the choice of initiator as a result of its solubility. Further, the process of the invention ought to be able to be implemented simply from a technical standpoint, even under heightened safety requirements, and particularly on an industrial scale. Particular interest attaches at the same time to obtaining polymers which have a high flash point.

We have found that this object is achieved by means of a process which involves introducing the monomers and the initiator each in different solvents and separating off virtually all of the initiator solvent after the end of the polymerization.

This process makes it possible, in a technically simple way, to obtain polymers in a desired solvent having a desired (high) flash point and at the same time to avoid the use of undiluted solid or liquid and/or pulverulent initiator(s).

The invention accordingly provides a process for preparing polymers which comprises introducing the monomers in a solvent 1 and the polymerization initiator in a solvent 2, solvent 1 being different from solvent 2, and removing solvent 2 virtually fully from the polymers after the end of the polymerization reaction.

For the purposes of the present invention, the term "polymers" embraces both polymer solutions and polymer dispersions.

The polymers for preparation in accordance with the invention comprise both copolymers and homopolymers of common monomers:

Vinyl esters of aliphatic, saturated or unsaturated $C_1-C_{24}$ carboxylic acids, such as formic acid, acetic acid, propionic acid, butyric acid, valeric acid, isovaleric acid, caproic acid, caprylic acid, capric acid, undecylenic acid, lauric acid, myristic acid, palmitic acid, palmitoleic acid, stearic acid, oleic acid, arachic acid, behenic acid, lignoceric acid, cerotinic acid, and melissic acid.

It is preferred to use vinyl esters of the abovementioned $C_1-C_{12}$ carboxylic acids, especially of the $C_1-C_6$ carboxylic acids. Vinyl acetate is very particularly preferred.

Ethylenically unsaturated monomers may be described by the following formula (I):

$$X\text{—}C(O)CR^2\text{=}CHR^1 \qquad (I)$$

where
X is selected from the group of the radicals —OH, —OM, —OR$^3$, NH$_2$, —NHR$^3$, N(R$^3$)$_2$;
M is a cation selected from the group consisting of: Na$^+$, K$^+$, Mg$^{++}$, Ca$^{++}$, Zn$^{++}$, NH$_4^+$, alkylammonium, dialkylammonium, trialkylammonium, and tetraalkylammonium;
the radicals R$^3$ may be selected, identically or differently, from the group consisting of —H, linear or branched-chain $C_1-C_{40}$ alkyl radicals, N,N-dimethylaminoethyl, 2-hydroxyethyl, 2-methoxyethyl, 2-ethoxyethyl, hydroxypropyl, methoxypropyl, and ethoxypropyl.
R$^2$ and R$^1$ are selected independently of one another from the group consisting of: —H, linear or branched-chain $C_1-C_8$ alkyl chains, methoxy, ethoxy, 2-hydroxyethoxy, 2-methoxyethoxy, and 2-ethoxyethyl.

Representative but nonlimiting examples of suitable monomers are, for example, acrylic acid or methacrylic acid and their salts, esters, and amides. The salts may be derived from any nontoxic metal, ammonium or substituted ammonium counterions.

The esters may be derived from linear $C_1-C_{40}$, branched-chain $C_3-C_{40}$ or carbocyclic $C_3-C_{40}$ alcohols, from polyfunctional alcohols having from 2 to about 8 hydroxyl groups such as ethylene glycol, hexylene glycol, glycerol and 1,2,6-hexanetriol, from amino alcohols or from alcohol ethers such as methoxyethanol and ethoxyethanol, (alkyl)polyethylene glycols, (alkyl)polypropylene glycols or ethoxylated fatty alcohols, examples being $C_{12}-C_{24}$ fatty alcohols reacted with from 1 to 200 ethylene oxide units.

Also suitable are N,N-dialkylaminoalkyl acrylates and methacrylates and N-dialkylaminoalkylacrylamides and methacrylamides of the formula (II)

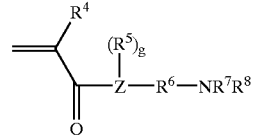

(II)

where
R$^4$=H or alkyl having from 1 to 8 carbon atoms,
R$^5$=H or methyl,
R$^6$=alkylene having from 1 to 24 carbon atoms, optionally substituted by alkyl,
R$^7$, R$^8$=$C_1-C_{40}$ alkyl radical,
Z=nitrogen if g=1 or oxygen is g=0.

The amides may be in unsubstituted, N-alkyl- or N-alkylamino-monosubstituted or N,N-dialkyl-substituted or N,N-dialkylamino-disubstituted form, where the alkyl or alkylamino groups are derived from linear $C_1-C_{40}$, branched-chain $C_3-C_{40}$ or carbocyclic $C_3-C_{40}$ units. In addition, the alkylamino groups may be quaternized.

Preferred monomers of the formula (II) are N,N-dimethylaminomethyl (meth)acrylate, N,N-diethylaminomethyl (meth)acrylate, N,N-dimethylaminoethyl (meth)acrylate, N,N-diethylaminoethyl (meth)acrylate, N-[3-(dimethylamino)propyl] methacrylamide, and N-[3-(dimethylamino)propyl] acrylamide.

Monomers which may likewise be used are substituted acrylic acids and their salts, esters, and amides, in which the substituents on the carbon atoms are in position two or three of the acrylic acid and are selected independently of one another from the group consisting of $C_1$–$C_4$ alkyl, —CN, COOH, with particular preference methacrylic acid, ethacrylic acid, and 3-cyanoacrylic acid. The salts, esters, and amides of these substituted acrylic acids may be selected as described above for the salts, esters, and amides of acrylic acid.

Other suitable monomers are allyl esters of linear $C_1$–$C_{40}$, branched-chain $C_3$–$C_{40}$ or carbocyclic $C_3$–$C_{40}$ carboxylic acids, vinyl or allyl halides, preferably vinyl chloride and allyl chloride, vinyl ethers, preferably methyl, ethyl, butyl or dodecyl vinyl ether, vinyl formamide, vinylmethylacetamide, vinylamine; vinyllactams, preferably vinylpyrrolidone and vinylcaprolactam, and vinyl- or allyl-substituted heterocyclic compounds, preferably vinylpyridine, vinyloxazoline, and allylpyridine.

Also suitable are N-vinylimidazoles of the formula (III), where $R^9$ to $R^{11}$ independently of one another are hydrogen, $C_1$–$C_4$ alkyl or phenyl:

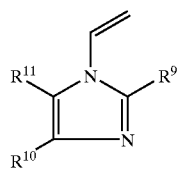

(III)

Further suitable monomers are diallylamines of the formula (IV)

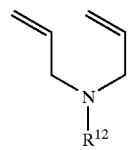

(IV)

where
$R^{12}$=$C_1$ to $C_{24}$ alkyl.

Further suitable monomers are vinylidene chloride; and hydrocarbons having at least one carbon-carbon double bond, preferably styrene, alpha-methylstyrene, tert-butylstyrene, butadiene, isoprene, cyclohexadiene, ethylene, propylene, 1-butene, 2-butene, isobutylene, vinyltoluene, and mixtures of these monomers.

Particularly suitable monomers are acrylic acid, methacrylic acid, ethyl acrylic acid, methyl acrylate, ethyl acrylate, propyl acrylate, n-butyl acrylate, isobutyl acrylate, t-butyl acrylate, 2-ethylhexyl acrylate, decyl acrylate, methyl methacrylate, ethyl methacrylate, propyl methacrylate, n-butyl methacrylate, isobutyl methacrylate, t-butyl methacrylate, 2-ethylhexyl methacrylate, decyl methacrylate, methyl ethacrylate, ethyl ethacrylate, n-butyl ethacrylate, isobutyl ethacrylate, t-butyl ethacrylate, 2-ethylhexyl ethacrylate, decyl ethacrylate, stearyl (meth)acrylate, 2,3-dihydroxypropyl acrylate, 2,3-dihydroxypropyl methacrylate, 2-hydroxyethyl acrylate, hydroxypropyl acrylates, 2-hydroxyethyl methacrylate, 2-hydroxyethyl ethacrylate, 2-methoxyethyl acrylate, 2-methoxyethyl methacrylate, 2-methoxyethyl ethacrylate, 2-ethoxyethyl methacrylate, 2-ethoxyethyl ethacrylate, hydroxypropyl methacrylates, glyceryl monoacrylate, glyceryl monomethacrylate, polyalkylene glycol (meth)acrylates, unsaturated sulfonic acids such as acrylamidopropanesulfonic acid, for example;

acrylamide, methacrylamide, ethacrylamide, N-methylacrylamide, N,N-dimethylacrylamide, N-ethylacrylamide, N-isopropylacrylamide, N-butylacrylamide, N-t-butylacrylamide, N-octylacrylamide, N-t-octylacrylamide, N-octadecylacrylamide, N-phenylacrylamide, N-methylmethacrylamide, N-ethylmethacrylamide, N-isopropylmethacrylamide, N-dodecylmethacrylamide, 1-vinylimidazole, 1-vinyl-2-methylvinylimidazole, N,N-dimethylaminomethyl (meth)acrylate, N,N-diethylaminomethyl (meth)acrylate, N,N-dimethylaminoethyl (meth)acrylate, N,N-diethylaminoethyl (meth)acrylate, N,N-dimethylaminobutyl (meth)acrylate, N,N-diethylaminobutyl (meth)acrylate, N,N-dimethylaminohexyl (meth)acrylate, N,N-dimethylaminooctyl (meth)acrylate, N,N-dimethylaminododecyl (meth)acrylate, N-[3-(dimethylamino)propyl]methacrylamide, N-[3-(dimethylamino)propyl]acrylamide, N-[3-(dimethylamino)butyl]methacrylamide, N-[8-(dimethylamino)octyl]methacrylamide, N-[12-(dimethylamino)dodecyl]methacrylamide, N-[3-(diethylamino)propyl]methacrylamide, N-[3-(diethylamino)propyl]acrylamide; N-isopropylmethacrylamide is particularly preferred;

maleic acid, fumaric acid, maleic anhydride and its monoester, crotonic acid, itaconic acid, diallyldimethylammonium chloride, vinyl ethers (for example: methyl, ethyl, butyl or dodecyl vinyl ether), vinylformamide, N-vinyl-N-methylacetamide, vinylamine; methyl vinyl ketone, maleimide, vinylpyridine, vinylimidazole, vinylfuran, styrene, styrenesulfonate, allyl alcohol, and mixtures thereof. N-vinyl-N-methylacetamide is particularly preferred.

Of these, particular preference is given to acrylic acid, methacrylic acid, maleic acid, fumaric acid, crotonic acid, maleic anhydride and its monoester, methyl acrylate, methyl methacrylate, ethyl acrylate, ethyl methacrylate, n-butyl acrylate, n-butyl methacrylate, t-butyl acrylate, t-butyl methacrylate, isobutyl acrylate, isobutyl methacrylate, 2-ethylhexyl acrylate, stearyl acrylate, stearyl methacrylate, N-t-butylacrylamide, N-octylacrylamide, 2-hydroxyethyl acrylate, hydroxypropyl acrylates, 2-hydroxyethyl methacrylate, hydroxypropyl methacrylates, alkylene glycol (meth)acrylates, styrene, unsaturated sulfonic acids such as, for example, acrylamidopropanesulfonic acid, vinylpyrrolidone, vinylcaprolactam, vinyl ethers (e.g.: methyl, ethyl, butyl or dodecyl vinyl ether), vinylformamide, N-vinyl-N-methylacetamide, vinylamine, 1-vinylimidazole, 1-vinyl-2-methylimidazole, N,N-dimethylaminomethyl methacrylate and N-[3-(dimethylamino)propyl]methacrylamide; 3-methyl-1-vinylimidazolium chloride, 3-methyl-1-vinylimidazolium methyl sulfate, N,N-dimethylaminoethyl methacrylate, N-isopropylmethacrylamide, N-[3-(dimethylamino)propyl]methacrylamide quaternized with methyl chloride, methyl sulfate or diethyl sulfate.

In one particularly preferred embodiment, copolymers and/or homopolymers of vinyllactams and/or vinylamides are prepared. In a further embodiment the copolymers and/or homopolymers of vinyllactams and/or vinylamides additionally contain methacrylates and/or acrylates. These are generally used within a weight range of from 1 to 40% by weight based on the polymer. In a further particularly preferred embodiment of the process of the invention, copolymers and/or homopolymers of vinylpyrrolidone and/or vinylcaprolactam are prepared.

Solvents suitable as solvent 1 (solvent for the monomers or monomer mixtures) are in principle all solvents and mixtures thereof in which the monomers or monomer mixtures are soluble or dispersible. Solvents 1, accordingly, also include dispersion media for monomers. They may be chosen freely by the skilled worker as a function of the monomers used. The process of the invention makes it possible to select solvent 1 solely on the basis of the solubility/dispersibility of the monomers and the ultimate end use of the polymers. It is an essential feature of the invention that solubility of the initiators need not be considered when selecting solvent 1.

In one preferred embodiment of the present invention solvent 1 is chosen such that its flash point is more than 61° C., in particular more than 100° C. Particularly preferred for the purposes of the present invention are 1,2-ethanediol (ethylene glycol) with a flash point of 111° C. and 1,2-propanediol (propylene glycol) with a flash point of 107° C.

Solvents suitable as solvent 2 (solvents for the initiators or initiator mixtures) are in principle all solvents and mixtures thereof in which the initiators or initiator mixtures are soluble. They may be chosen freely by the skilled worker as a function of the initiators used.

In one preferred embodiment solvent 2 is chosen such that its flash point is less than 61° C., in particular less than 35° C., more particularly less than 20° C. In one embodiment of the present invention the flash point of solvent 2 is at least 50° C., in particular at least 70° C., below the flash point of solvent 1.

Particularly suitable solvents 2 are methanol with a flash point of 11° C., ethanol (12° C.), isopropanol (12° C.), ethyl acetate (−4° C.), acetone (−18° C.), 1-butanol (29° C.), 2-butanol (24° C.), isobutanol (28° C.), cyclohexane (−17° C.), tetrahydrofuran (−18° C.), and toluene (4° C.). Preferred solvents 2 are methanol, ethanol, and isopropanol.

The present invention includes the finding that it is preferred to choose solvents 1 and 2 which are homogeneously miscible with one another. The present invention further embraces the finding that it is preferred to choose solvents 1 and 2 such that separation of the solvent 2 from the reaction mixture after polymerization has taken place, by means of distillation, is easy to do.

As possible solvents 1 and/or 2 mention may be made, for example, of:

methanol, ethanol, isopropanol, n-proposal, tertiary-butanol, n-butanol, secondary-butanol, and higher straight-chain, branched or cyclic monoalcohols; ethylene glycol, propylene glycol, glycerol, and higher straight-chain, branched or cyclic difunctional, trifunctional or polyfunctional alcohols; diethylene glycol, triethylene glycol, and higher homologs consisting of ethylene oxide and propylene oxide units; n-hexane, n-heptane, cyclohexane, isooctane, and higher straight-chain, branched or cyclic alkanes; benzene, toluene, ethylbenzene, xylene, and higher alkylbenzenes; phenol, cresol, resorcinol, and higher monofunctional and difunctional (alkyl)benzenes; acetone, methyl ethyl ketone, acetophenone, cyclohexanone, and higher straight-chain, branched or cyclic aliphatic and aromatic ketones; dimethylformamide, dimethylacetamide, N-methylpyrrolidone, N-ethylpyrrolidone, dimethyl sulfoxide, and other customary organic solvents. Likewise suitable in principle are natural or synthetic waxes, oils, fats, and emulsifiers which are liquid under the polymerization conditions—both per se and in a mixture with the above-mentioned organic solvents or with water.

As initiators for the free-radical polymerization it is possible to use the peroxo compounds and/or azo compounds which are customary for this purpose, examples being alkali metal or ammonium peroxodisulfates, diacetyl peroxide, dibenzoyl peroxide, succinyl peroxide, di-tert-butyl peroxide, tert-butyl perbenzoate, tert-butyl perpivalate, tert-butyl permaleate, cumene hydroperoxide (=α,α-dimethylbenzyl hydroperoxide), diisopropyl peroxodicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, azobis(2-amidinopropane) dihydrochloride, 2,2'-azobis(2-methylbutyronitrile), dicumyl peroxide (=bis(1-methyl-1-phenylethyl) peroxide) or tert-butyl dicumyl peroxide. Also suitable are initiator mixtures or redox initiator systems, such as ascorbic acid/iron(II) sulfate/sodium peroxodisulfate, tert-butyl hydroperoxide/sodium disulfite, or tert-butyl hydroperoxide/sodium hydroxymethanesulfinate.

Preference is given to using organic peroxides, especially di-tert-butyl peroxide and tert-butyl peroctoate.

Procedure

The monomer (or monomer mixture) to be polymerized is dissolved or dispersed in solvent 1. The initiator is dissolved in solvent 2. The amount of initiator or initiator mixtures based on the amount of monomers used is generally between 0.01 and 10% by weight, preferably between 0.1 and 5% by weight. The concentration of the initiator solution used is advantageously below 50% by weight, in particular below 20% by weight. Very particular preference is given to using an initiator solution in a concentration of from 1 to 10% by weight. The desired concentration of the initiator solution is normally set by dilution with solvent 2. In one preferred embodiment of the present invention, the polymerization initiator is dissolved in solvent 2, diluted to the desired concentration with solvent 1, and then added to the monomers.

The addition of the initiator solution to the monomer solution or monomer dispersion may take place in a single stage, in multiple stages or continuously.

In one preferred embodiment of the present invention no further substances are added to the reaction mixture. The present invention also, however, embraces processes in which further substances are added to the reaction mixture, such as regulators, emulsifiers, protective colloids and/or salt, for example. These substances are normally added by way of the monomer solution or monomer dispersion; likewise possible, although less preferred, is their direct addition or addition together with the initiator solution.

A detailed description of suitable protective colloids is given in Houben-Weyl, Methoden der organischen Chemie, Volume XIV/1, Makromolekulare Stoffe, Georg-Thieme-Verlag, Stuttgart, 1961, pp. 411 to 420. Suitable emulsifiers include anionic, cationic and nonionic emulsifiers. As accompanying surface-active substances it is preferred to use exclusively emulsifiers, whose molecular weights, unlike those of the protective colloids, are normally below 2000 g/mol. Where mixtures of surface-active substances are used it is of course necessary for the individual components to be compatible with one another, and in case of doubt this can be checked by means of a few preliminary tests. As surface-active substances it is preferred to use anionic and nonionic emulsifiers. customary accompanying emulsifiers are, for example, ethoxylated fatty alcohols (EO units: 3 to 50, alkyl: $C_8$ to $C_{36}$), ethoxylated mono-, di- and trialkylphenols (EO units: 3 to 50, alkyl: $C_4$ to $C_9$), alkali metal salts of dialkyl esters of sulfosuccinic acid and also alkali metal salts and ammonium salts of alkyl sulfates (alkyl: $C_8$ to $C_{12}$), of ethoxylated alkanols (EO units: 4 to 30, alkyl: $C_{12}$ to $C_{18}$), of ethoxylated alkylphenols (EO units: 3 to 50, alkyl: $C_4$ to $C_9$), of alkylsulfonic acids (alkyl: $C_{12}$ to $C_{18}$), and of alkylarylsulfonic acids (alkyl: $C_9$ to $C_{18}$).

Suitable emulsifiers can also be found in Houben-Weyl, Methoden der organischen Chemie, Volume 14/1, Makromolekulare Stoffe, Georg Thieme Verlag, Stuttgart, 1961, pages 192 to 208.

Examples of emulsifier trade names include Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, etc.

The surface-active substance is normally used in amounts of from 0.1 to 10% by weight, based on all of the monomers to be polymerized.

Examples of suitable regulators include the following: formaldehyde, acetaldehyde, propionaldehyde, n-butyraldehyde, and isobutyraldehyde, formic acid, ammonium formate, hydroxylammonium sulfate, hydroxylammonium phosphate, di-n-butyl sulfide, di-n-octyl sulfide, diphenyl sulfide, diisopropyl disulfide, di-n-butyl disulfide, di-n-hexyl disulfide, diacetyl disulfide, di-t-butyl trisulfide, n-butyl mercaptan, n-hexyl mercaptan, n-dodecyl mercaptan, t-dodecyl mercaptan, ethyl thioglycolate, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, diethanol sulfide, thiodiglycol, ethylthioethanol, thiourea, allyl alcohol, allyl bromide, benzyl chloride, chloroform, and tetrachloromethane.

The polymerization may be carried out by means of a batch process or a (semi)continuous feed process, the polymerization takes place in general in the temperature range from 40 to 200° C., preferably in the range from 60 to 170° C., with particular preference in the range from 85 to 150° C., in particular in the range between 120 and 140° C. It is normally conducted under atmospheric pressure but may also proceed under reduced or elevated pressure, preferably between 1 and 10 bar. After the end of polymerization, solvent 2 is removed almost fully from the reaction mixture. For the purposes of the present invention, "almost fully" implies removal to a level of below 5% by weight, in particular below 1% by weight, based on the polymer. The polymer may be present in the form of a dispersion or, preferably, in the form of a solution. The weight indication refers to the total weight of the dispersion or solution. Solvent 2 may be separated off from the reaction mixture by any of the methods known to the skilled worker: for example, by distillation, by passing steam through the solution or dispersion once or a number of times or continuously, with or without application of a vacuum, and also by passing gases through the solution or dispersion, such as nitrogen, for example.

In one advantageous embodiment of the present invention the flash points of solvent 1 and solvent 2 differ by at least 50° C., in particular by at least 70° C.

The flash point is determined in accordance with DIN EN 22719.

The polymers (solutions or dispersions) prepared by the process of the invention therefore have a flash point which is close to the flash point of solvent 1. In one preferred embodiment of the present invention the polymer prepared by the process of the invention has a flash point of more than 61° C.

The solids content of the polymers (solutions or dispersions) prepared by the process of the invention is generally between 10 and 60%, in particular between 20 and 50%, with particular preference between 30 and 40%, by weight and may be adjusted where appropriate to the desired level by dilution with solvent 1.

The K values of the polymers are generally in the range from 10 to 100, preferably from 10 to 35. The particular K value desired may be set in conventional manner by the composition of the ingredients. The K values are determined by the method of Fikentscher, Cellulosechemie 13 (1932) 58 to 64 and 71 to 74 in ethanol at 25° C. and at polymer concentrations which depending on K value range lie between 0.1% by weight and 5% by weight.

The polymers prepared by the process of the invention are suitable for a large number of industrial applications.

It is known that in media containing gas molecules such as $CO_2$ or hydrocarbons, e.g., $C_1$–$C_4$ alkanes, and water it is possible under certain conditions for gas hydrates, also known as clathrate hydrates, to form. These gas hydrates are composed of the aforementioned gas molecules surrounded by a "cage" of water molecules. Gas hydrates of this kind also occur in water-containing natural petroleum or natural gas mixtures and may thus cause clogging of the pipelines, for example, during transportation. In order to prevent this, gas hydrate inhibitors are added to the petroleum or natural gas mixtures. Surprisingly it has been found that the polymers prepared by the process of the invention are advantageously suitable as gas hydrate inhibitors.

The present invention accordingly further provides for the use of the polymers prepared by the process of the invention as gas hydrate inhibitors. Preference is given here to those polymers which are present in the form of solutions and have a flash point of more than 61° C.

EXAMPLE

Preparation of a Copolymer of Vinylcaprolactam and Vinylpyrrolidone

Experimental Setup: 6 l Juvo Vessel with 4 Feed Units and One Reflux Condenser

The monomers (242.44 g of vinylcaprolactam, 80.86 g of vinylpyrrolidone) were dissolved in 170.49 g of ethylene glycol (=feed stream 1). The initiator (9.74 g of di-tert-butyl peroxide) was dissolved in 40.50 g of isopropanol and then diluted with 47.18 g of ethylene glycol (=feed stream 2). The initial charge (267.35 g of ethylene glycol) was evacuated, injected once with 5 bar of nitrogen, and evacuated again. Then 111.50 g of feed stream 1 were added at room temperature to the initial charge, after which 0.5 bar of nitrogen was injected in the polymerization vessel and the mixture was heated to 130° C. with stirring at 50 rpm. At a temperature of 128° C., 64.71 g of feed stream 2 were added. After the onset of the reaction, metering of the remaining amounts of 1 and 2 was commenced; feed stream 1 was metered in over 3 h, feed stream 2 over 5 h. Polymerization was then continued at 130° C. for 12 h. Thereafter, the vessel was let down via a condenser, with the external vessel temperature being 130° C. A vacuum of not more than −800 mbar was slowly established and the isopropanol was distilled off from the reaction mixture.

The solids content of the polymer solution was adjusted to 40% by weight by adding ethylene glycol, and then the solution was drained through a 400µ filter.

The polymer solution had a solids content of 40.4% by weight and a K value (5% strength in ethanol) of 23.9. The isopropanol fraction was 7000 ppm (=0.7% by weight). The flash point of the polymer solution was 81° C.

We claim:

1. A process comprising, polymerizing a plurality of monomers to form one or more polymers, wherein the monomers are mixed with a first solvent, and a polymerization initiator is mixed with a second solvent, and removing the second solvent almost fully from the polymers after the polymerization, wherein the first solvent is different from the second solvent, and wherein the first solvent has a flash point of more than 61° C.

2. The process as claimed in claim 1, wherein the second solvent has a flash point of less than 61° C.

3. The process as claimed in claim 1, wherein the second solvent is removed to a level of below 5% by weight based on the polymer.

4. The process as claimed in claim 1, wherein the polymerization initiator is dissolved in the second solvent, diluted with the first solvent, and then mixed with the monomers.

5. The process as claimed in claim 1, wherein the monomers are selected from the group consisting of vinyllactams, vinylamides acrylates, methacrylates, acrylarnides, and methacrylamides.

6. The process as claimed in claim 1, wherein the monomers comprise a vinyllactam selected from the group consisting of vinylpyrrolidinone, vinylcaprolactam and a mixture thereof.

7. The process as claimed in claim 1, wherein the monomers comprise N-vinyl-N-methylacetamide.

8. The process as claimed in claim 1, wherein the monomers comprise N-isopropylmethacrylamide.

9. The process as claimed in claim 1, wherein the reaction is conducted in one or more stages or continuously.

10. The process as claimed in claim 1, wherein the first solvent has a flash point of more than 100° C.

11. The process as claimed in claim 1, wherein the second solvent has a flash point of less than 35° C.

12. The process as claimed in claim 1, wherein the second solvent has a flash point of less than 20° C.

13. A polymer obtained by the process claimed in claim 1.

14. A gas hydrate inhibitor comprising a polymer obtained by the process claimed in claim 1.

15. A method comprising, mixing the gas hydrate inhibitor of claim 14 with a mixture comprising petroleum or natural gas mixtures.

16. The polymer as claimed in claim 13, wherein the polymer has a flash point of more than 61° C.

17. A method comprising, inhibiting the formation of gas hydrates by mixing the polymer as claimed 13 with a mixture comprising gas molecules.

18. A process comprising, polymerizing a plurality of monomers to form one or more polymers, wherein the monomers are mixed with a first solvent, and a polymerization initiator is mixed with a second solvent, and removing the second solvent almost fully from the polymers after the plymerization, wherein the first solvent is different from the second solvent, and wherein said plurality of monomers comprise a vinyllactam selected from the group consisting of vinylpyrrolidone and vinylcaprolactam.

19. The process as claimed in claim 18, wherein the second solvent has a flash point of less than 61° C.

20. The process as claimed in claim 18, wherein the second solvent is removed to a level of below 5% by weight based on the polymer.

21. The process as claimed in claim 18, wherein the polymerization initiator is dissolved in the second solvent, diluted with the first solvent, and then mixed with the monomers.

22. The process as claimed in claim 18 wherein the reaction is conducted in one or more stages or continuously.

23. The process as claimed in claim 18, wherein the solvent has a flash point of more than 100° C.

24. The process as claimed in claim 18, wherin the second solven has a flash point of less than 35° C.

25. The process as claimed in claim 18, wherein the second solvent has a flash point of less than 20° C.

26. A polymer obtained by the process claimed in claim 18.

27. A gas hydrate inhibitor comprising a polymer obtanied by the process claimed in claim 18.

28. A method comprising, mixing the gas hydrate inhibitor of claim 27 with a mixture comprising petroleum or natural gas mixtures.

29. The polymer as claimed in claim 27, wherein the polymer has a flash point of more than 61° C.

30. A method comprising, inhibiting the formation of gas hydrates by mixing the polymer as claimed in claim 27 with a mixture comprising gas molecules.

* * * * *